United States Patent [19]

Sansevero, Jr. et al.

[11] Patent Number: 4,533,067

[45] Date of Patent: Aug. 6, 1985

[54] FLUID MEDIUM STORAGE AND EXPULSION APPARATUS

[75] Inventors: Vincent J. Sansevero, Jr., East Hartford; Walter F. Skrabal, Windsor Locks, both of Conn.

[73] Assignee: United Technologies Corporation, Hartford, Conn.

[21] Appl. No.: 406,405

[22] Filed: Aug. 9, 1982

[51] Int. Cl.[3] .................................... F02K 9/50

[52] U.S. Cl. .................................... 222/135; 222/389; 92/36

[58] Field of Search ............... 417/392, 373, 437, 472; 60/39.462, 39.48, 259; 222/386.5, 389, 135; 92/36, 34, 44, 120

[56] References Cited

U.S. PATENT DOCUMENTS

| | | | |
|---|---|---|---|
| 2,021,154 | 11/1935 | Smith | 417/472 |
| 2,859,808 | 11/1958 | Youngquist et al. | 60/39.48 |
| 3,104,526 | 9/1963 | Hirschfeld et al. | 222/386.5 |
| 3,154,093 | 10/1964 | Blackburn et al. | 222/386.5 |
| 3,234,728 | 2/1966 | Christian et al. | 60/35.3 |
| 3,246,580 | 4/1966 | Huska | 92/120 |
| 3,296,803 | 1/1967 | Kroekel | 60/259 |
| 3,300,981 | 1/1967 | Webb | 60/259 |
| 3,446,435 | 5/1969 | Hager | 239/265.23 |
| 3,473,333 | 10/1969 | Parker | 60/259 |
| 3,494,513 | 2/1970 | Bauer | 222/386.5 |
| 3,508,686 | 4/1970 | Goldberg | 222/135 |
| 3,680,310 | 8/1972 | Arvidson | 60/39.48 |
| 3,842,598 | 10/1974 | Forsten | 60/259 |
| 3,895,746 | 7/1975 | Bauer | 222/386.5 |
| 3,991,559 | 11/1976 | Oda et al. | 60/39.46 R |
| 4,120,151 | 10/1978 | Quigley | 60/39.462 |
| 4,132,332 | 1/1979 | Wassilieff | 222/389 |

*Primary Examiner*—Leonard E. Smith
*Attorney, Agent, or Firm*—John Swiatocha

[57] ABSTRACT

An apparatus (10) for the storage therewithin and expulsion therefrom of a fluid medium includes a tubular tank (15) and a pair of diametrically opposed, simultaneously actuatable pistons (50) permanently sealed to the tank by a pair of rupturable seals (65). The pistons are driven by a secondary fluid the effects of which are shielded from the interior surface of the tank by a pair of flexible shields fixed at the ends thereof to a corresponding piston and the inner surface of the tank, movement of the pistons effecting an expansion of the shields to form a protective lining for the tank.

10 Claims, 3 Drawing Figures

FIG. 1
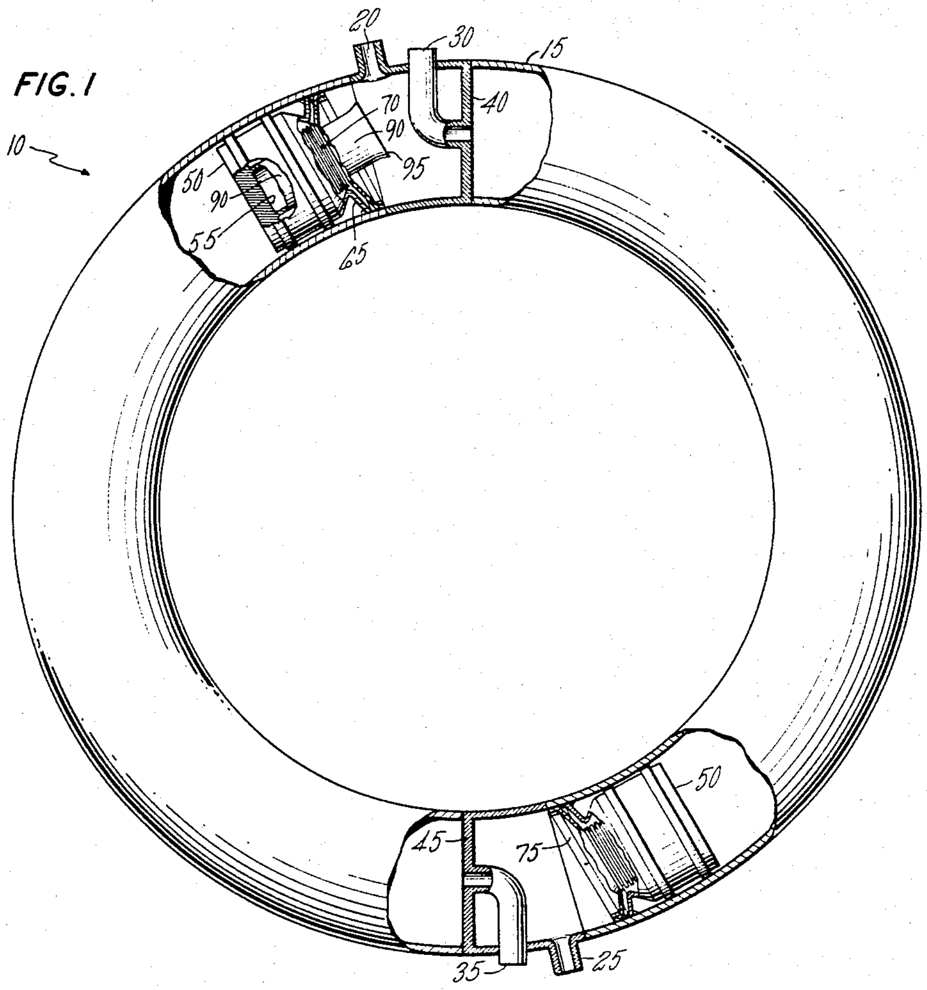
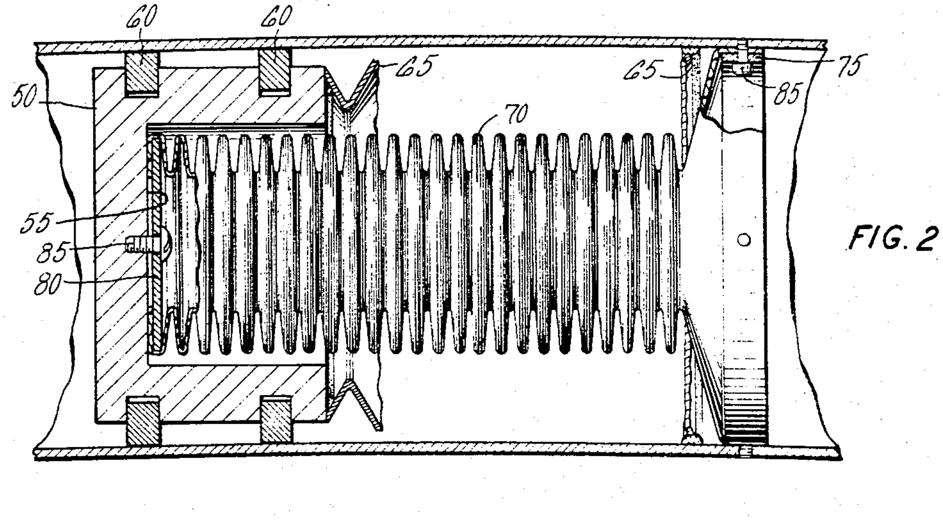
FIG. 2

FLUID MEDIUM STORAGE AND EXPULSION APPARATUS

DESCRIPTION

1. Technical Field

This invention relates to apparatus for the storage therewithin and expulsion therefrom of a fluid medium and particularly such an apparatus for use with a propellant for a vehicle such as a missile or the like.

2. Background Art

Rocket powered vehicles such as missiles or space vehicles may require a pressurized fluid such as, for example, a propellant for use in the steering control of a solid propellant rocket engine, or a fuel for an attitude thruster. In the prior art, it has been the practice to store such a pressurized (primary) fluid in a container therefor and drive the primary fluid out of the tank with, for example, a pressurizing gas (secondary fluid) obtained from the combustion of a solid propellant charge, from the exhaust of the main vehicle engine, or a compressed gas stored on the vehicle. The container may comprise a flexible bladder which is collapsed by the secondary fluid to expel the primary fluid therefrom. Alternatively, the container may comprise a rigid toroidal or helical tank through which a piston is driven by the secondary fluid to expel the primary fluid from the tank. While piston-tank arrangements have exhibited various advantages over the aforementioned flexible bladder system, the piston-tank systems themselves are not without certain shortcomings. One such shortcoming is the inability of such systems to store the primary fluid in the tank for indefinite period of time without leakage of the fluid from the tank, between the inner surface of the tank walls and the piston. A second shortcoming is the imbalance that a displaceable piston imparts to the system (and vehicle) as the piston traverses the tank. For example, where the tank is toroidal or helical in shape, such as is the case where the tank is required to be placed around a body such as the main vehicle engine, a single piston traversing the tank from one end to another to expel the fluid therefrom will necessarily create a cyclic, lateral mass imbalance in the vehicle, thereby risking deviaton of the vehicle from a desired path or trajectory. In addition, the tank is susceptible to damage from heat carried by the secondary fluid as, for example, where the secondary fluid comprises a gas released by a solid propellant charge or the exhaust from the vehicles' main engine.

DISCLOSURE OF INVENTION

It is therefore, a principal object of the present invention to provide an improved fluid medium storage and expulsion apparatus.

It is another object of the present invention to provide such an apparatus capable of long term storage of a fluid therewithin with minimal risk of leakage of the fluid therefrom.

It is another object of the present invention to provide such an apparatus wherein balance of the apparatus is maintained as the fluid is expelled therefrom.

It is another object of the present invention to provide such an apparatus wherein the risk of thermal damage to a tank employed in the apparatus from a secondary fluid is minimized.

In accordance with the present invention, risk of leakage of fluid from the apparatus is minimized by the provision of a rupturable seal permanently fixed to the piston and wall of the tank. In accordance with another aspect of this invention, balance of the system is maintained by provision in the system of pistons in opposed pairs thereof such that displacement of a first of the pistons is balanced by a similar displacement of an opposite piston. In accordance with yet another aspect of the present invention, overheating of the tank walls due to the impingement thereagainst of hot secondary fluid is minimized by an expandable heat shield fixed at one end thereof to an inner surface of the tank wall and at an opposite end thereof, to the piston. Piston movement through the tank expands the heat shield such that the shield is interposed between the hot secondary fluid and the inner surface of the tank wall. In the preferred embodiment the seal comprises a rupturable bellows or diaphragm-type seal and the expandable heat shields comprise tubular cloth members, accordian-pleated for enhanced compactness in storage.

BRIEF DESCRIPTION OF DRAWINGS

FIG. 1 is a partially sectioned elevation of a preferred embodiment of the present invention.

FIG. 2 is an enlarged, sectioned elevation of one of the pistons and heat shields employed in the apparatus.

BEST MODE FOR CARRYING OUT THE INVENTION

Figure 3:
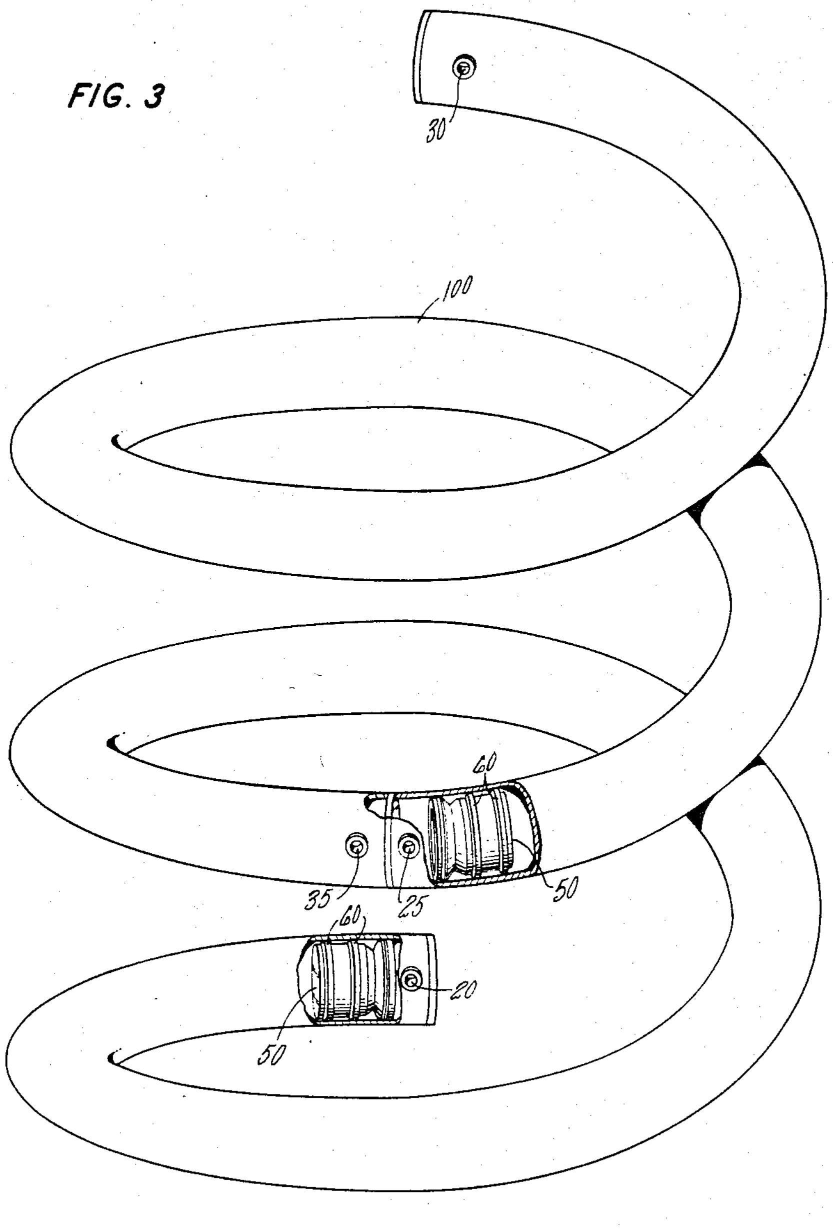
FIG. 3 is an elevation of an alternate embodiment of the tank employed in the apparatus of the present invention.

Referring to FIGS. 1 and 2, the apparatus of the present invention is indicated generally at 10 and comprises an annular tank 15 in which a primary fluid is stored and subsequently expelled. The tank may be of any desired cross section, such as a circular cross section wherein the tank is of toroidal shape. Tank 15 includes a pair of diametrically opposed inlet ports 20 and 25 through which a secondary fluid is admitted to the tank. A pair of diametrically opposed exhaust ports 30 and 35 are also provided in the tank and accommodate the flow of primary fluid discharged from the tank. The tank is divided into two generally equal volumes by wall members 40 and 45, wall member 40 accommodating exhaust port 30 therethrough and wall member 45 acommodating exhaust port 35 therethrough. Tank 15 is formed from any material compatible with the chemical and pressure characteristics of the primary and secondary fluids. For example, where the primary fluid is hydrazine monopropellant, and the secondary fluid is hydrocarbon products of combustion, the tank is formed from a titanium alloy.

Disposed within tank 15 are a pair of substantially identical pistons, each shown at 50. The pistons are generally cup shaped, each including a hollow portion 55 interiorly thereof. The pistons are sealed to the interior surfaces of the tank walls by dynamic seals 60 received within mating grooves within the lateral piston surfaces. Like tank 15, pistons 50 and seals 60 are formed from any suitable material compatible with the chemical and pressure characteristics of the primary and secondary fluids and, like the inlet and outlet ports, the pistons are generally diametrically opposed to one another. Equal pressurization of the pistons with secondary fluid and equal primary fluid flow impedances causes each piston to traverse a corresponding half of the tank, as it remains diametrically opposed to the other piston whereby the center of gravity of the apparatus remains generally stationary to preserve the desired attitude of the vehicle in which the apparatus is employed.

To prevent leakage of the primary fluid from between the piston and tank walls during long term storage, the apparatus is provided with seals 65 permanently affixed to the pistons and tank walls by any suitable technique. In the preferred embodiment wherein the tank, pistons and seals are formed from titanium alloy, seals 65 are affixed to the pistons and tank walls by welding or the like. As shown, the seals may be of the bellows variety. However, other equivalent configuratons may suggest themselves to those skilled in the art without departing from the present invention.

To prevent overheating of the tank walls when a hot secondary fluid is admitted to the tank, the apparatus of the present invention is provided with a pair of extendable heat shields 70 each being fixed both to the inner surface of the tank and the pistons such that piston movement extends the heat shields longitudinally, interposing the shield between the secondary fluid and the tank wall. The heat shield will be capable of withstanding higher temperatures than the tank wall, and in the preferred embodiment, comprises a cloth of such material as woven glass, quartz or ceramic fibers. Such cloths are also capable of being compactly folded by, for example, providing the cloth with accordian pleats as shown in the drawings. Thus, it will be noted that when the pistons are in their initial positions (adjacent the inlet ports) the heat shields may be stored within hollows 55 in a compact manner and are readily extended by the pistons with little risk of self-interference from any adjacent components.

For preservation of shape, each heat shield may be provided with a plurality of stays conforming to the cross section of the shield. In general, the shields and the stays are of a cross section conforming to that of the tank 15. For example, where tank 15 is of circular cross section, the heat shield will be generally cylindrical and the stays will be generally round. It is noted that the stays may be formed from a single helican element of a stiff wire or the like.

The heat shield may be fastened to the tank and piston by any suitable means. As illustrated, end portions of the shield cloth may be folded or hemmed and clamped to the piston and tank walls by clamp rings 75 and 80 fixed to the piston and tank walls by any suitable means such as rivets or bolts 85. If desired, to reduce the risk of thermal damage to the heat shield from the initial pressurization of the tank with the secondary fluid, the piston may be provided with a longitudinally extending skirt or tubular portion 90 disposed interiorly of the heat shield. Tube 90 may include a flange 95 extending outwardly therefrom at the end thereof for channeling the secondary fluid around the heat shield and into the interior of the tubular portion.

In operation, the tank is filled with the primary fluid, and the pistons are disposed within the tank in diametrically opposed relation to one another adjacent to the secondary fluid inlet ports 20 and 25. The heat shield is compressed (by folding at the pleats thereof) within the interior of the pistons. The seal 65 being permanently affixed to the piston and tank walls, effectively prevents escape of the primary fluid from between the piston and tank walls during long term periods of storage. When the primary fluid is required to be expelled from the tank such as, for example, for adjusting the attitude of a missile in which the apparatus is used, the interiors of the pistons are pressurized with secondary fluid (from, for example, a solid propellant charge) through inlet ports 20 and 25 through suitable valve means (not shown). Pressurization of the piston interiors ruptures seals 65 thereby allowing the pistons to traverse the interior of the tank, forcing the primary fluid in the tank through exhaust ports 30 and 35. Inasmuch as the pistons are identical and diametrically opposed, both will, under similar pressurization, move at equivalent rates and remain diametrically opposed so that the center of mass of the apparatus remains fixed thereby minimizing the risk of imbalance of the apparatus and hence, the vehicle in which it is employed. Movement of the pistons extends the heat shields which protect the metallic tank walls from the secondary fluid, the accordian pleats and stays in the heat shield ensuring the smooth expansion of the shields.

While the apparatus of the present invention has been described with a generally toroidal primary fluid tank, it will be understood where the need exists for enhanced tank capacity the present invention may be employed with multiple tanks or a helical tank 100 as shown in FIG. 3. In this latter configuration, the pistons remain diametrically opposed as they traverse the tank in a common direction thereby maintaining the lateral (radial) location of the center mass of the apparatus, constant. However, it will be noted that such movement of the pistons will shift the longitudinal location of the system's center of mass. While the tank configuration shown in FIG. 3 may be appropriate where enhanced capacity offered by the helical tank is required and a longitudinal shift in center of mass can be tolerated, where such a longitudinal shift in the center of mass cannot be tolerated, two tanks may be formed, one from a right-hand helix and the second from a left-hand helix, the pistons traversing the helices from opposite ends thereof toward the center. In such a configuration, pistons will remain diametrically opposed, approaching each other longitudinally from the ends thereby maintaining the longitudinal location of the center of mass of the apparatus as well as lateral (radial) location thereof.

Although the present invention has been described in conjunction with a single primary fluid, it will be appreciated that multiple primary fluids may be employed without departing from the invention. For example, referring to FIG. 1, the apparatus shown therein may be employed with two fluids such as a fuel and an oxidizer wherein, the fuel is stored in the volume between the lower piston and wall 40 and the oxidizer in the volume between the upper piston and wall 45 or vice versa. Upon discharge from apparatus 10, the fuel and oxidizer may be mixed for ignition, suitable conduits and valving (not shown) channeling the fluids into contact with one another.

It will also be appreciated that while the invention has been described with two pistons, more pistons may be employed with equal utility. Thus, the single toroidal tank shown in FIG. 1 may be divided into four or more compartments, each compartment including a piston therein for driving fluid therefrom. Each piston would be disposed oppositely a like piston for maintenance of the location of the system center of mass. In such an arrangement, by way of example, two of the compartments may accommodate fuel while the other two compartments may accommodate oxidizer or, each compartment may accommodate a different fluid.

Having thus described the invention, what is claimed is:

1. Apparatus for the storage therewithin and expulsion therefrom of a primary fluid, said apparatus comprising a generally tubular tank radially spaced from and disposed about a central axis normal to the longitudinal axis of the tank, a piston slidably disposed in said tank for longitudinal movement therewithin, thereby expelling said primary fluid from said tank, said tank including an inlet port through which a secondary fluid is introduced into said tank for driving said piston, said apparatus being characterized by:

- a flexible, expandable shield connected at one end thereof to said piston and an opposite end thereof to an inner wall of said tank, said shield being expanded by movement of said piston, thereby forming a lining for said tank by which said tank is shielded from the effects of said secondary fluid;
- said piston having a hollow portion interiorly thereof, said shield being foldably received within said hollow portion in a nonextended condition when said piston is disposed in a postion proximal to said inlet; and
- said hollow portion of said piston being provided with a tubular skirt extending therefrom interiorly of said shield for protecting said shield in a nonextended state from the initial effects of the admission of said secondary fluid into said tank.

2. The apparatus according to claim 1, further characterized by said heat shield being of a tubular shape and formed from a cloth fabric.

3. Apparatus for the storage therewithin and expulsion therefrom of a primary fluid medium, said apparatus comprising:

- a generally tubular tank radially spaced from and disposed about a central axis normal to the longitudinal axis of the tank and a first piston slidably disposed in said tank for longitudinal movement therewithin, thereby expelling said primary fluid from said tank, said tank including a first inlet port through which a secondary fluid is introduced into said tank for driving said first piston and a first exhaust port accommodating a flow of said primary fluid medium expelled from said tank by said first piston, said apparatus being characterized by:
- a second piston slidably disposed in said tank and moveable therewithin simultaneously with said first piston in diametrically opposed relation thereto for minimizing therewith, an imbalancing of said apparatus;
- a second inlet port in said tank for accommodating the admission therethrough of said secondary fluid for driving said second piston; and
- a second exhaust port in said tank for accommodating a flow of said fluid medium expelled from said tank by said second piston.

4. The apparatus of claim 3 further characterized by said first inlet port being disposed generally diametrically opposite said second inlet port and said first exhaust port being disposed generally diametrically opposite said second exhaust port.

5. The apparatus of claim 3 further characterized by a pair of seals each permanently fixed to one of said pistons and an adjacent inner surface of said tank, said seals being rupturable by movement of said pistons in response to the admission into said tank of said secondary fluid through said first and second inlet ports.

6. The apparatus of claim 3 further characterized by a pair of tubular, extendable shields, each, at one end thereof being fixed to said tank generally adjacent a corresponding inlet port and at another end thereof, fixed to a corresponding piston, movement of said corresponding piston extending said shield longitudinally of said tank for protecting the inner surface thereof from said secondary fluid.

7. The apparatus of claim 6 wherein said shields are formed from a cloth fabric.

8. The apparatus of claim 6 further characterized by said pistons including hollow portions therein in which said shields are received in a nonextended condition when said pistons are disposed proximally to said inlet ports.

9. The apparatus of claim 6 further characterized by said shields being formed from an accordian-pleated cloth fabric.

10. The apparatus of claim 9 wherein said heat shield is provided with a multiplicity of longitudinally aligned stays of shape conforming to that of the cross section of said heat shield.

* * * * *